(12) United States Patent
Mackenzie et al.

(10) Patent No.: US 7,928,844 B2
(45) Date of Patent: Apr. 19, 2011

(54) SYSTEM AND METHOD FOR TRACKING AN INVENTORY WITHIN AN ASSET

(75) Inventors: Patricia Denise Mackenzie, Clifton Park, NY (US); Charles Burton Theurer, Alplaus, NY (US); Kevin Chean, New York, NY (US); Andrew John Calver, Westwood, CA (US); Roman Brusilovsky, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 658 days.

(21) Appl. No.: 11/861,548

(22) Filed: Sep. 26, 2007

(65) Prior Publication Data

US 2009/0079565 A1    Mar. 26, 2009

(51) Int. Cl.
*G08B 13/14* (2006.01)
(52) U.S. Cl. .................................. 340/572.1
(58) Field of Classification Search .... 340/572.1–572.9, 340/10.1
See application file for complete search history.

(56) References Cited

U.S. PATENT DOCUMENTS

| 2007/0001809 A1* | 1/2007 | Kodukula et al. ............. 340/10.1 |
| 2007/0290849 A1* | 12/2007 | Tuttle .......................... 340/572.1 |
| 2008/0042842 A1* | 2/2008 | Ulibarri ....................... 340/572.1 |

OTHER PUBLICATIONS

Patricia Denise Mackenzie et al.; "Method and System for Discrete Location Triggering for Enhanced Asset Management and Tracking"; Pending U.S. Appl. No. 11/289,945, filed Nov. 29, 2005.
Robert August Graziano et al.; "System and Method for Providing Asset Management and Tracking Capabilities"; Pending U.S. Appl. No. 11/610,891, filed Dec. 14, 2006.
Patricia D. Mackenzie et al.; "A System for Simplified Trailer Driver Communication and a Method of Operating the Same"; Pending U.S. Appl. No. 11/559,977, filed Nov. 15, 2006.

* cited by examiner

*Primary Examiner* — Phung Nguyen
(74) *Attorney, Agent, or Firm* — Richard A. DeCristofaro

(57) ABSTRACT

A technique is provided for tracking and/or monitoring an inventory within one or more assets. The technique includes activating a plurality of antennas on each of the one or more assets in turn for a specified period of time, and receiving a response from an RFID tag attached to the inventory through the plurality of antennas located on an asset having the inventory along with a positional information of the asset having the inventory.

23 Claims, 3 Drawing Sheets

SYSTEM AND METHOD FOR TRACKING AN INVENTORY WITHIN AN ASSET

BACKGROUND

The invention relates generally to supply chain management, and more specifically to wireless tracking of inventories within one or more assets.

Maintaining an accurate and current record of inventories and/or assets at each step of a supply chain process has long been an area of focus for streamlining and optimizing these processes. Conventionally, maintaining and tracking inventories involved following a paper trail related to the inventories and/or assets. Unfortunately, much of the paperwork required to maintain the accuracy of the record is often either missing, late, or erroneously completed. Another technique for enhancing efficiency of the supply chain process involves placement of unique computer-readable identification codes, e.g. bar codes on the inventories. By scanning these at various checkpoints during delivery, a record of the inventories may be maintained. Unfortunately, this process requires the affirmative step of locating and scanning each identification code in a timely manner. Further, these techniques lead to unnecessary delay in the supply chain process.

Current tracking systems employing global positioning systems (GPS), radio frequency identification (RFID) and/or other similar technologies have greatly helped in streamlining and optimizing the supply chain processes. Typically, RFID readers are installed at the entrances and exits of supply chain entities. For example, RFID readers can be installed at the exit gate of a manufacturing facility, the entrance of a distribution center and then again at the exit of the distribution center. Hence, one can track in real time where the inventories are in the supply chain, in the manufacturing facility, or in the distribution center or in the retail store. Similarly, GPS based tracking system may be employed to track the assets such as trailer, rail cars, shipping or cargo containers, and the like during transit. Thus, these systems enable monitoring and management of various inventories and/or the assets.

However, existing techniques are prohibitively expensive to be implemented, particularly where large numbers of inventories are included in each shipment and these solutions are not sufficiently broad-based and robust for real life problems. Moreover, current tracking systems fail to provide information regarding the inventories during transit. For example, once an inventory tagged with RFID leaves the manufacturing facility and is loaded into the trailer, the tagged inventory cannot be tracked. This is particularly important as more and more companies are relying on trailers or mobile assets to act as a mobile warehouse for them. Thus, there is a need to get real time information of where the inventories and/or assets are at any point in time.

It is therefore desirable to provide a technique for tracking and/or monitoring inventories in an automated, efficient, accurate and cost-effective fashion from their point of shipment to their point of delivery. Additionally, it is desirable to provide a robust tracking system for enabling an integrated solution for a number of specific customer needs, such as: tracking mobile assets; tracking and/or monitoring inventories within these mobile assets; providing validation of pickups and deliveries; providing visibility into the capacity of the mobile assets; and providing visibility into the condition and location of the inventories and/or assets anywhere in the world and making that information available to the customer.

BRIEF DESCRIPTION

Briefly, in accordance with one aspect of the technique, a method is provided for determining location of an inventory within an asset. The method provides for activating a plurality of antennas in turn for a specified period of time, receiving response from an RFID tag attached to the inventory through the plurality of antennas, and analyzing the response to determine the location of the inventory within the asset. Systems and computer programs that afford such functionality may be provided by the present technique.

In accordance with another aspect of the technique, a method is provided for tracking an inventory within one or more assets. The method provides for activating a plurality of antennas on each of the one or more assets in turn for a specified period of time, and receiving response from an RFID tag attached to the inventory through the plurality of antennas located on an asset having the inventory along with a positional information of the asset having the inventory. Here again, systems and computer programs affording such functionality may be provided by the present technique.

In accordance with an additional aspect of the technique, a method is provided for tracking an inventory within one or more assets. The method provides for sending a request to one or more RFID readers to locate the inventory within the one or more assets. Each of the one or more RFID readers is configured to communicate with a plurality of antennas located on each of the one or more assets respectively. The method further provides for activating the plurality of antennas on each of the one or more assets in turn for a specified period of time via an activation signal generated by the one or more RFID readers, receiving response from an RFID tag attached to the inventory through the plurality of antennas located on an asset having the inventory via the RFID reader along with a position information of the asset having the inventory. The method further provides for analyzing the response to determine location of the inventory within the asset having the inventory by comparing the number of times the RFID tag is successfully read within the specified period of time and/or the strength of the response signal from the RFID tag received by each of the plurality of antennas located on the asset having the inventory. Here again, systems and computer programs affording such functionality may be provided by the present technique.

In accordance with a further aspect of the technique, a system is provided for tracking an inventory within one or more assets. The system includes one or more RFID readers configured to activate a plurality of antennas located on the corresponding one or more assets in turn for a specified period of time. The plurality of antennas is configured to receive a response from an RFID tag attached to the inventory and relay the response to the corresponding RFID reader upon being activated.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present techniques are generally directed to wireless tracking and/or monitoring of inventories. Such tracking and/or monitoring techniques may be useful in tracking and/or monitoring inventories at each step of a supply chain process, such as at manufacturing facility, during transit, at distribution centers or warehouses, at retail stores, and so forth. Though the present discussion provides examples in context of in-transit tracking and/or monitoring, one of ordinary skill in the art will readily apprehend that the application of these techniques in other contexts, such as for tracking and/or monitoring inventories at manufacturing facilities, warehouses, distribution center and retail stores, is well within the scope of the present techniques.

Figure 1:
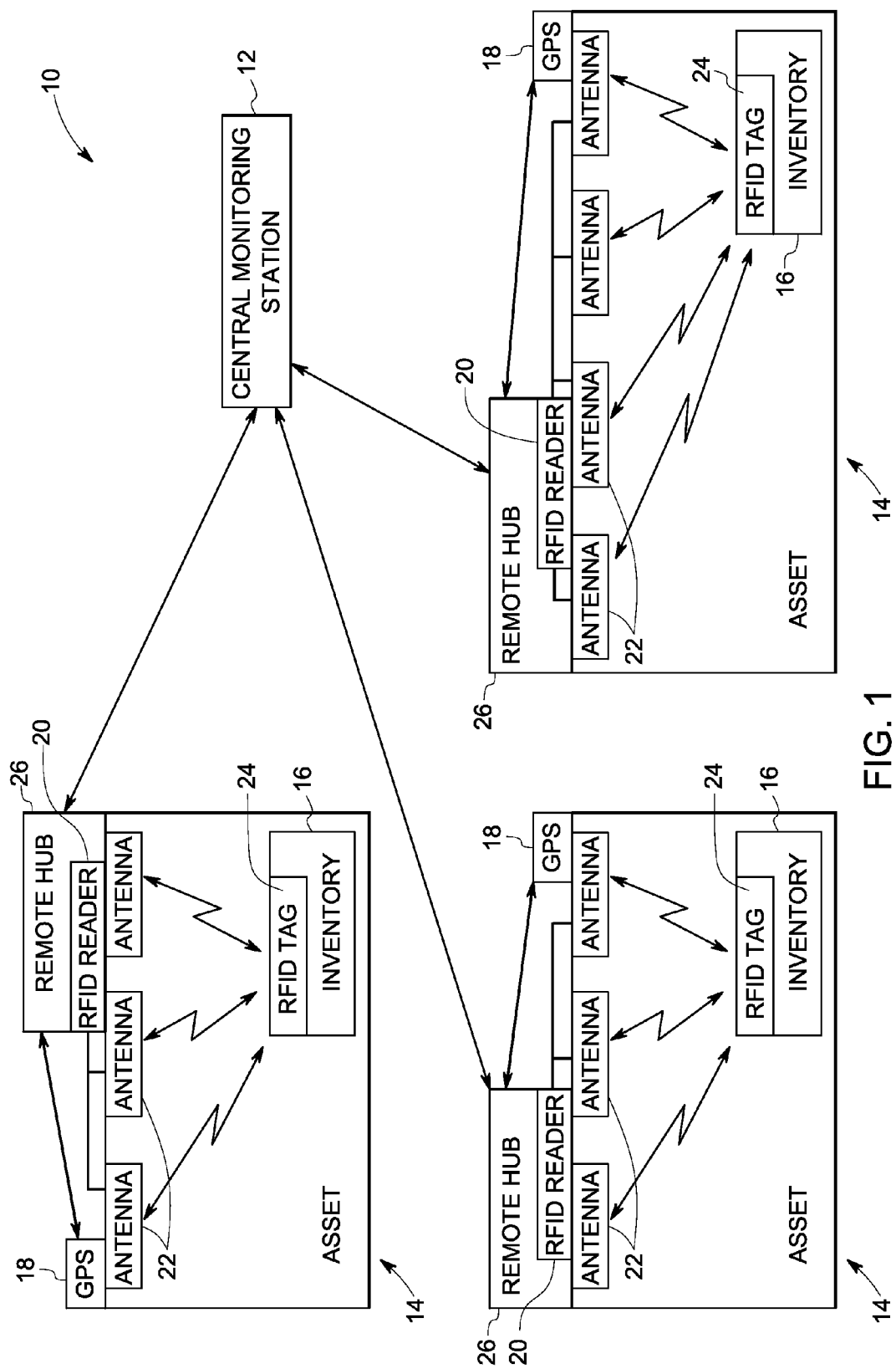
FIG. 1 is a schematic diagram of an asset management and tracking system in accordance with aspects of the present technique.

Referring now to FIG. 1, a schematic diagram of an exemplary asset management and tracking system 10 is illustrated in accordance with aspects of the present technique. The asset management and tracking system 10 includes a monitoring or tracking station 12 for monitoring and/or tracking one or more assets 14 and one or more inventories 16 disposed within the one more assets 14. In certain embodiments, the monitoring and/or tracking may be performed at a centralized monitoring and/or tracking station. Further, in certain embodiments, the one or more assets 14 may be mobile assets that may be employed to deliver inventories 16 from one place to another. These mobile assets may include trailers, cargo containers shipped by boat, rail boxcars, and so forth. Alternatively, the one or more assets 14 may be a manufacturing facility, a warehouse, a distribution center or a retail store where the inventories 16 may be temporarily stationed.

Each of the one or more assets 14 may be equipped with a position sensing or locating device 18 that receives positional information of the asset. It should be noted that the position sensing device 18 may be adapted to track the location of the mobile asset either throughout the transit or only upon being activated. The position sensing (locating) device 18 may include one or more of a GPS-based position sensing device, a TV-based position sensing device, a TV-GPS based position sensing device, a wireless access point network-based position sensing device, and/or a GSM network-based position sensing device. These position sensing devices 18 utilize TV signals, GPS signals, GSM signals, or wireless network signals for determining positional information of the mobile asset being tracked.

Additionally, each of the one or more assets 14 may be equipped with one or more RFID readers 20 and a plurality of antennas 22 coupled to the one or more RFID readers 20 for tracking inventories within the asset 14 as will be described in greater detail below. The plurality of antennas 22 may be placed at a plurality of locations within the asset 14. In one embodiment, the plurality of antennas 22 are placed evenly within the asset 14. It should be noted that any antenna design may be employed via the system 10 such as discrete antennas or one antenna with multiple segments that can be activated independently. The plurality of antennas 22 are adapted to receive responses from one or more RFID tags 24 within range upon being activated by the RFID readers 20 and relay the responses to the corresponding RFID readers 20. As will be appreciated by one skilled in the art, the RFID tags 24 are attached to the inventories 16 being tracked or monitored.

Each of the assets 14 further includes a remote hub 26 that is in communication with the position sensing device 18, the RFID readers 20 and the monitoring station 12. Additionally, the remote hubs 26 may be in direct communication with each other. In certain embodiment, the remote hub 26 receives a request from the monitoring station 12, activates or initiate the position sensing device 18 and the RFID readers 20, receives response data from the RFID readers 20 and positional information from the position sensing device 18, processes/analyzes response data, transmits the received data, a subset of the received data, or the analyzed data to the monitoring station 12, and so forth. Thus, the remote hub 26 acts as a link between the position sensing device 18 and the RFID readers 20 on the asset and the monitoring station 12.

The remote hub 26 may include a communication device for receiving and transmitting signals from and to the monitoring station 12 and/or the other hubs 26 over a wired, a wireless, or a satellite communication network. The communication device may include one or more of an Ethernet port, a USB port, IEEE 1394 port, a GSM-based communication device, a GPRS-based communication device, a wireless communication device, a device configured to communicate with communication satellites (e.g., low earth orbit satellites, geo-stationary satellites, etc.), or other devices known to one skilled in the art. Additionally, the remote hub is configured to communicate with the position sensing device 18 and/or the RFID readers 20 over a wired or a wireless communication network (e.g., Bluetooth, Zigbee, IEEE 802.15.4, etc.). It should be noted that, in certain embodiments, the position sensing device 18 and/or the RFID readers 20 may be integrated into the remote hub 26. As will be appreciated by those skilled in the art, the remote hub 26 may be a GE VeriWise system or a modified GE VeriWise system. Further, in certain embodiments, the remote hub 26 may include a processor for processing or analyzing the response received from the position sensing device 18 and/or the RFID readers 20 and determining the location of the asset and/or the presence and/or the location of the inventory within the asset based on the analysis. It should be noted that the remote hub 26 may do data processing functions so that not all of the acquired data need be sent to the monitoring or tracking station 12 over the communication network.

The remote hub 26 may also process the inventory results and decide what is important to send. For example, in certain embodiments, the remote hub 26 may determine if an exception, i.e. an unexpected, undesirable or out-of-tolerance condition, is detected in the inventory in an asset. For instance, an exception to the inventory may include missing portions of the inventory (i.e., known inventory that can't be detected) or the presence of unexpected inventory in an asset. This type of exception can occur due to improper loading and unloading of the asset. Thus, the hub 26 may send simply an exception report to the monitoring or tracking station 12 and not the complete response data received from the position sensing device 18 and the RFID readers 20. Alternatively, it should be noted that, in certain embodiments, the position sensing device 18 and the RFID readers 20 may be able to communicate with the monitoring station 12 directly over a wired or wireless communication network.

The monitoring or tracking station 12 receives the processed or analyzed information from the remote hub 26 and convey the results to the user directly or after further processing or analysis. Alternatively, the monitoring or tracking station 12 may determine the presence and/or the location of the inventory 16 and/or the location of the asset 14 based on the response data received from the one or more remote hubs 26. It should be noted that only those hubs that receive response from the queried tags report back to the monitoring or tracking station 12. Alternatively, as noted above, the monitoring or tracking station 12 may determine the presence and/or the location of the inventory 16 based on the responses received directly from the position sensing devices 18 and the RFID readers 20. Thus, in certain embodiments, the monitoring or tracking station 12 may process/analyze response received from the RFID reader (directly or through the hub) corresponding to the asset having the inventory to determine the presence and/or the location of the inventory within that asset. Further, in certain embodiments, the monitoring and/or tracking station may provide a visual display of the inventory within the asset. Moreover, in certain embodiments, the monitoring or tracking station 12 may analyze distribution of weight within the asset and/or loading capacity of the assets based upon the presence/absence of inventories within the assets. For example, if inventories 16 have been unloaded from an asset at a certain point in the supply chain process, the monitoring or tracking station 12 will inform the user that the asset is partially filled and new inventories can be loaded into the asset based on known size and/or weight of the loaded/unloaded inventories. Further, in certain embodiments, the monitoring or tracking station 12 may provide the user with inventory related information (e.g., weight, date of expiration, date of manufacture and so forth) based on a priori information of the identified inventory. As will be appreciated by those skilled in the art, the monitoring or tracking station may monitor or track the assets and the inventories periodically or upon request.

Figure 2:
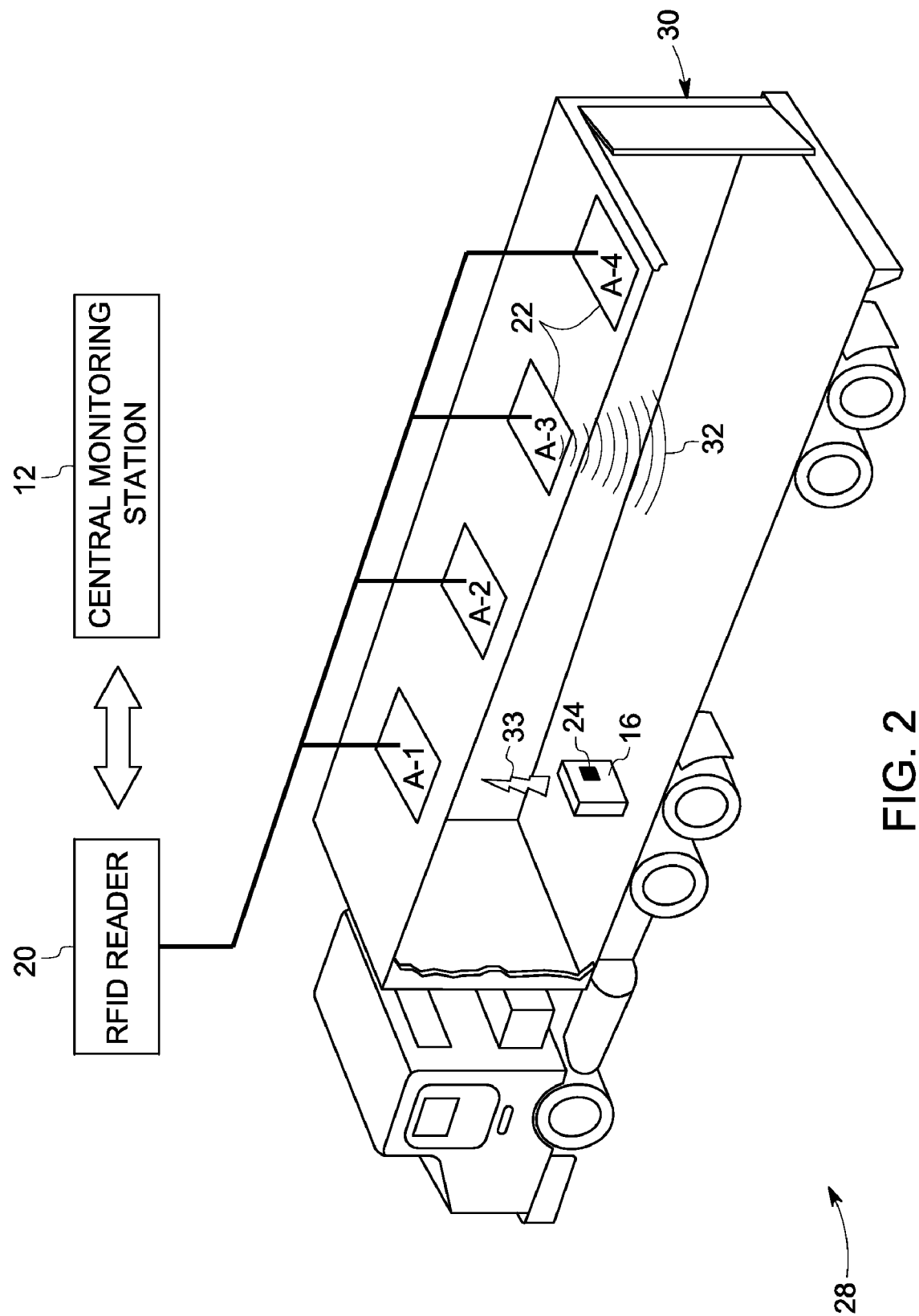
FIG. 2 depicts a RFID based tracking system for locating an inventory within an asset in accordance with aspects of the present technique.

FIG. 2 illustrates an exemplary RFID based tracking system 28 for tracking an inventory within an asset (e.g., a trailer) in accordance with aspects of the present technique. As illustrated, the system 28 includes a monitoring station 12 in communication with a RFID reader 20, such as a commercially available RFID reader from Alien Technology Corporation. As noted above, the RFID reader 20 may be in communication with the monitoring station 12 directly or through the hub (not shown). The monitoring station 12 may request (activate/initiate) the RFID reader 20 to find an inventory 16 within a trailer 30. The RFID reader 20 upon receiving request activates the plurality of antennas 22 in turn (one at a time) for a specified period of time (e.g., for 1 second or for 1.3 seconds) via an activation signal. Each of the antennas 22 upon being activated emits radio frequency (rf) signals 32. The RFID tag 24 attached to the inventory 16 receives the rf signal 32 and responds back with rf signal 33 comprising its unique identification code. The plurality of antennas 22 receive the response 33 from RFID tags within range and relay it to the RFID reader 20, which further relays the response data (RFID data) to the monitoring station 12 over a wireless or satellite communication network directly or through the hub (not shown). The monitoring station 12 may then analyze the response to determine the presence and the location of the RFID tag 24 (if present). Alternatively, as noted above, the hub (not shown) may analyze the response to determine the presence and the location of the RFID tag 24 and relay the result to the monitoring station 12. In certain embodiments, the monitoring or tracking station 12 or the hub (not shown) may analyze the response by comparing the number of times the RFID tag 24 is successfully read within the specified period of time and/or the strength of the response signal received by each of the plurality of antennas 22 located on the trailer 30. Additionally, the monitoring station 12 may provide a visual display of inventory location and identification within the trailer. Thus, end users can check in real time the location of their inventories that are tagged with RFID tags.

In the illustrated embodiment, four antennas 22 are coupled to an RFID reader 20. The reader 20 activates and queries each antenna 22, which reads the RFID tags 24 that are within range. After querying the four antennas 22, the reader 20 sends the results (response data) to the monitoring station 12 directly or through the hub. The monitoring station 12 or the hub analyzes the read counts and signal strength from each tag 24 and statistically compares it with the data that it receives from the other antenna 22 via an algorithm. For example, if in a 1 second time period tag A is found 10 times in antenna 1 and 4 times in antenna 2, the algorithm would determine that the object with the RFID tag is somewhere between antenna 1 and 2, but much closer to antenna 1. As will be appreciated by one skilled in the art, the reader may employ anti-collision algorithm so as to ensure that all tags are read when the antennas are activated. For example, in one embodiment, a tag may wait for random time before responding to avoid the collision. Alternatively, a set of tags (say 10 tags in each set) responds before the next set responds.

Figure 3:
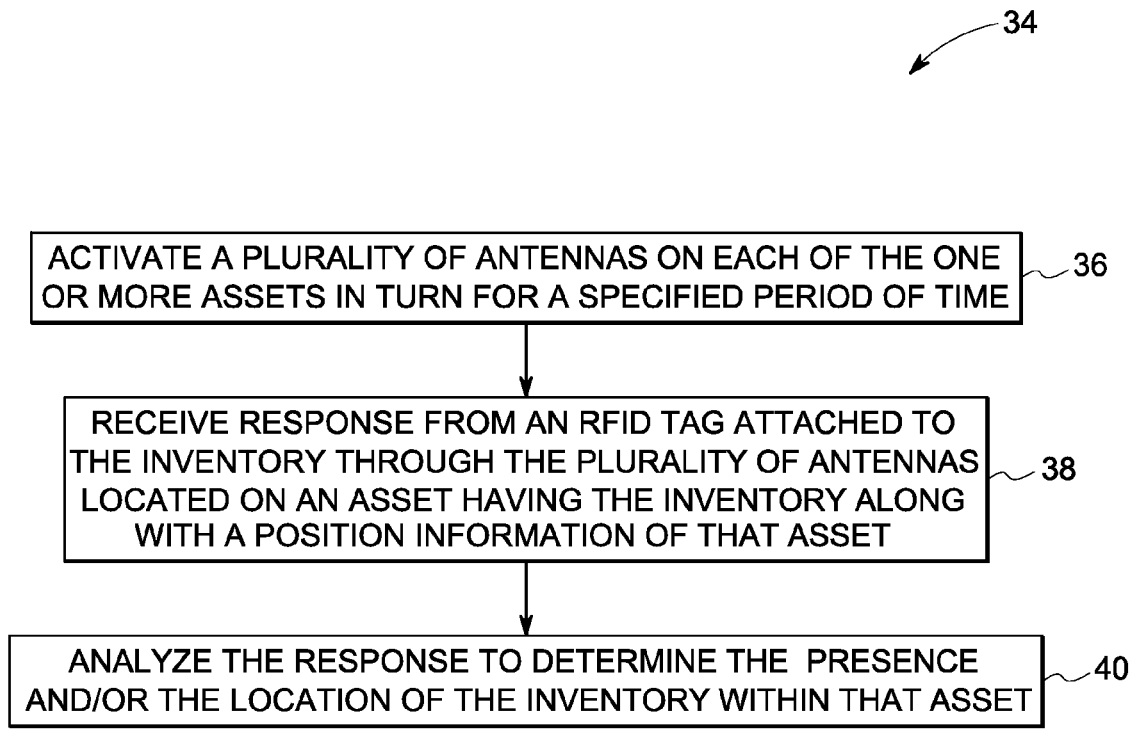
FIG. 3 depicts a control scheme for tracking an inventory within one or more assets in accordance with aspects of the present technique.

A control scheme 34 for tracking an inventory 16 within one or more assets 14 via the asset management and tracking system 10 is illustrated in FIG. 3 in accordance with aspects of the present technique. The control scheme 34 includes activating a plurality of antennas on each of the one or more assets in turn for a specified period of time at step 36, receiving response from an RFID tag attached to the inventory through the plurality of antennas located on an asset having the inventory along with a position information of that asset at step 38, and analyzing the response to determine the presence and/or the location of the inventory (if present) within that asset at step 40. By determining the location of the asset using the techniques discussed above, identifying the presence of the inventory within a particular asset (step 40) allows precise global identification of the inventory's position.

As will be appreciated by those skilled in the art, the control scheme 34 may further include the step of sending a request to one or more RFID readers to locate the inventory within the one or more assets. As noted above, each of the one or more RFID readers is configured to communicate with a plurality of antennas located on each of the one or more assets respectively. The plurality of antennas may then be activated via an activation signal generated by the one or more RFID readers. Further, as noted above, analyzing the response to determine the location of the inventory within the asset at step 40 further comprises comparing the number of times the RFID tag is successfully read within the specified period of time and/or the strength of the response signal from the RFID tag received by each of the plurality of antennas located on the asset.

Figure 4:
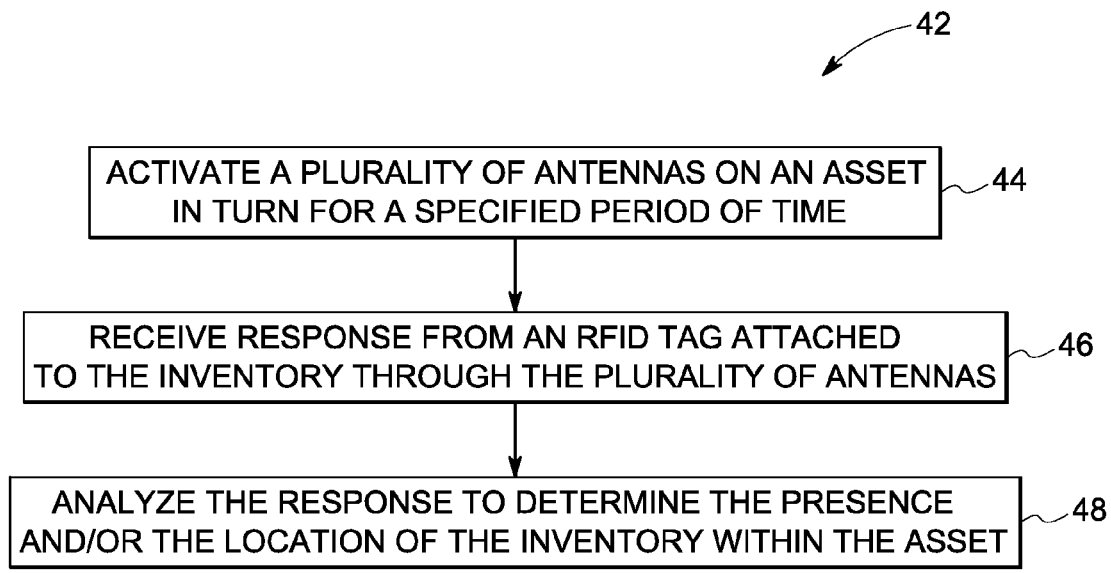
FIG. 4 depicts a control scheme for determining location of an inventory within an asset in accordance with aspects of the present technique.

Similarly, a control scheme 42 for determining location of an inventory within an asset via the RFID based tracking system 28 is illustrated in FIG. 4 in accordance with aspects of the present technique. The control scheme 42 includes activating a plurality of antennas on an asset in turn for a specified period of time at step 44, receiving response from an RFID tag attached to the inventory through the plurality of antennas at step 46, and analyzing the response to determine the presence and/or the location of the inventory (if present) within the asset at step 48.

As will be appreciated by those skilled in the art, the tracking system and techniques, described in the various embodiments discussed above, provides supply chain intelligence by enabling real time tracking and/or monitoring of assets and tagged inventories at each step in the supply chain process. For example, the techniques enable a person to know where an inventory is in a supply chain process, specifically in which trailer and where in the trailer via an intelligent RFID trailer system. The techniques further provide the end user visibility into the capacity in their asset (e.g., trailer).

The system, described in the various embodiments discussed above, is an advanced asset management system that provides not only information about presence of an inventory within an asset (whether the inventory is present or not) but also provides substantially accurate information of location of the asset having the inventory (where the asset is), location of the inventory within that asset (where in the asset the inventory is if present), how full the asset is (how much loaded) and/or what inventories are there. For example, the asset management and tracking system 10 may send real time data of which inventories are in the trailer, the location of those inventories within the trailer, and of the capacity of the trailer through the GE VeriWise system. Coupled with real-time location data about the trailer (such as from a GE Veri-Wise system), the user can know exactly where each element in their inventory is and in what condition. Hence, the customers are able to track their assets and inventories in real time. As will be appreciated by those skilled in the art, the present technique further provides inventory verification or validation of pickups and deliveries, thereby ensuring that right inventories are loaded on or unloaded from the trailer at the right place. Such systems are specifically useful as more and more trailers are being used as mobile warehouses.

Moreover, the use of multiple antennas at various positions within the asset not only enables locating an inventory within an asset but also provides coverage, thereby increasing the likelihood of tagged inventories being recorded at all. The techniques employ one reader for multiple antennas to accurately detecting the location of the objects inside an asset. This significantly reduces the cost and the energy usage. However, it should be noted that multiple readers may also be employed by the present technique for a large number of antennas.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of determining location of an inventory within an asset, the method comprising:
   activating each of a plurality of antennas for a specified period of time;
   receiving a response from an RFID tag attached to the inventory through the plurality of antennas; and
   analyzing the response to determine the location of the inventory within the asset, wherein analyzing the response comprises comparing for each of the plurality of antennas one or more of the number of times the RFID tag is successfully read within the specified period of time by each of the plurality of antennas, or the strength of the response signal from the RFID tag received by each of the plurality of antennas.

2. The method of claim 1, further comprising attaching the RFID tag to the inventory.

3. The method of claim 1, further comprising sending activation signal to each of the plurality of antennas through an RFID reader.

4. The method of claim 1, wherein the plurality of antennas are placed at a plurality of locations within the asset.

5. The method of claim 4, wherein the plurality of antennas are evenly placed within the asset.

6. The method of claim 1, wherein the plurality of antennas generate radio frequency signals upon being activated.

7. The method of claim 1, wherein receiving the response comprises receiving unique identification of the RFID tag upon being activated by radiofrequency signal transmitted by the plurality of antennas.

8. The method of claim 1, further comprising providing a visual display of the inventory within the asset.

9. The method of claim 1, wherein analyzing the response is performed by a processor located on the asset.

10. A method of tracking an inventory within one or more assets, the method comprising:
    activating each of a plurality of antennas on each of the one or more assets for a specified period of time;
    receiving a response from an RFID tag attached to the inventory through the plurality of antennas located on an asset having the inventory along with a positional information of the asset having the inventory; and
    analyzing the response to determine the location of the inventory within the asset having the inventory, wherein analyzing the response comprises comparing for each of the plurality of antennas one or more of the number of times the RFID tag is successfully read within the specified period of time by each of the plurality of antennas, or the strength of the response signal from the RFID tag received by each of the plurality of antennas located on the asset having the inventory.

11. The method of claim 10, further comprising sending an activation signal to each of the plurality of antennas located on each of the one or more asset through one or more RFID readers.

12. The method of claim 10, wherein analyzing the response is performed by a processor located on the asset.

13. The method of claim 10, wherein receiving the positional information of the asset having the inventory comprises utilizing a TV signal, a GPS signal, a GSM signal, or a wireless network signal for determining the positional information.

14. The method of claim 10, further comprising analyzing a load capacity of each of the one or more assets based upon the presence of one or more inventories within the one or more assets.

15. The system of claim 14, further comprising a position sensing device coupled to each of the one or more assets for receiving and relaying positional information of the respective asset.

16. The system of claim 15, wherein the position sensing device comprises at least one of a GPS-based position sensing device, a TV-based position sensing device, a wireless access point network-based position sensing device, a GSM network-based position sensing device, or a combination thereof.

17. A method of tracking an inventory within one or more assets, the method comprising:
    sending a request to one or more RFID readers to locate the inventory within the one or more assets, each of the one or more RFID readers configured to communicate with a plurality of antennas located on each of the one or more assets respectively;
    activating the plurality of antennas on each of the one or more assets in turn for a specified period of time via an activation signal generated by the one or more RFID readers;
    receiving a response from an RFID tag attached to the inventory through the plurality of antennas located on an asset having the inventory via the RFID reader along with a position information of the asset having the inventory; and analyzing the response to determine location of the inventory within the asset having the inventory by comparing for each of the plurality of antennas one or more of the number of times the RFID tag is successfully read within the specified period of time by each of the plurality of antennas, or the strength of the response signal from the RFID tag received by each of the plurality of antennas located on the asset having the inventory.

18. The method of claim 17, wherein analyzing the response is performed by a processor located on the asset.

19. A system for tracking an inventory within one or more assets, the system comprising:
one or more RFID readers configured to activate a plurality of antennas located on the corresponding one or more assets in turn for a specified period of time, the plurality of antennas configured to receive a response from an RFID tag attached to the inventory and relay the response to the corresponding RFID reader upon being activated, wherein the processor is configured to analyze the response to determine the location of the inventory within the asset having the inventory by comparing for each of the plurality of antennas one or more of the number of times the RFID tag is successfully read within the specified period of time by each of the plurality of antennas, or the strength of the response signal from the RFID tag received by each of the plurality of antennas located on the asset having the inventory.

20. The system of claim 19, further comprising a processor in communication with the one or more RFID readers and configured to initiate the one or more RFID readers.

21. The system of claim 20, wherein the processor is located within a central monitoring station.

22. The system of claim 21, wherein the central monitoring station is further configured to provide a visual display of the inventory within the asset having the inventory.

23. The system of claim 20, wherein the processor is located within one of the one or more assets.

* * * * *

UNITED STATES PATENT AND TRADEMARK OFFICE
CERTIFICATE OF CORRECTION

| | | |
|---|---|---|
| PATENT NO. | : 7,928,844 B2 | Page 1 of 1 |
| APPLICATION NO. | : 11/861548 | |
| DATED | : April 12, 2011 | |
| INVENTOR(S) | : Mackenzie et al. | |

It is certified that error appears in the above-identified patent and that said Letters Patent is hereby corrected as shown below:

In Column 8, Line 42, in Claim 15, delete "system" and insert -- method --, therefor.

In Column 8, Line 46, in Claim 16, delete "system" and insert -- method --, therefor.

Signed and Sealed this
Twenty-sixth Day of June, 2012

David J. Kappos
*Director of the United States Patent and Trademark Office*